United States Patent [19]

Eden

[11] 4,236,156
[45] Nov. 25, 1980

[54] SWITCHING OF THERMOCHROMIC AND PRESSURE SENSITIVE FILMS WITH SURFACE ACOUSTIC WAVES

[75] Inventor: Dayton D. Eden, Dallas, Tex.
[73] Assignee: Vought Corporation, Dallas, Tex.
[21] Appl. No.: 32,448
[22] Filed: Apr. 23, 1979
[51] Int. Cl.³ .............................................. G09F 9/00
[52] U.S. Cl. .................................. 340/786; 340/783; 340/713; 350/353; 350/358; 358/235
[58] Field of Search ............... 340/783, 786; 350/353, 350/358, 359, 363; 358/213, 235

[56] References Cited

U.S. PATENT DOCUMENTS

| | | | |
|---|---|---|---|
| 3,438,022 | 4/1969 | Jeeg et al. | 340/786 |
| 3,633,996 | 1/1972 | Lean et al. | 350/358 |
| 3,736,044 | 5/1973 | Lean et al. | 350/358 |
| 3,789,421 | 1/1974 | Chivian et al. | 350/353 X |
| 3,831,165 | 8/1974 | Chivian et al. | 340/786 X |
| 4,009,488 | 2/1977 | Smith | 350/358 X |
| 4,065,791 | 12/1977 | Kowel et al. | 358/213 |
| 4,069,507 | 1/1978 | Defranould et al. | 358/213 |

*Primary Examiner*—David L. Trafton
*Attorney, Agent, or Firm*—James M. Cate; Herbert J. Hammond

[57] ABSTRACT

An apparatus for "fast erase" of thermochromic information displays is provided. A piezoelectric substrate (10) has a thin film (18) of vanadium dioxide deposited on the surface thereof. The film undergoes marked increases in reflectance at any region thereof experiencing thermal heating in excess of its predetermined transition temperature. An ultrasonic surface acoustic wave transducer (11) is provided which includes a pair of electrodes (12, 14) spaced apart in substantially parallel relation on the surface of the substrate (10) such that application of an RF signal across the electrodes (12, 14) causes deformation of the substrate to generate surface acoustic waves on the surface thereof and in the film to counteract built-in strains in the film to erase images written into the film.

A solid state information display using pressure sensitive material is also disclosed. A thin film of samarium sulphide (30) is deposited on the surface of a piezoelectric substrate (10) such as lithium niobate. The film undergoes marked increases in reflectance at any region thereof subjected to a pressure in excess of a predetermined threshold pressure. Three surface acoustic wave transducers (34, 36, 38) are provided on the substrate (10) positioned relative to the film such that eastwardly, westwardly and northwardly traveling surface waves are produced in the film. A video signal generator (40) is provided for each of the transducers with delay units (42) for launching pulses at preselected times in the film such that a point of pressure in excess of the threshold pressure can be selectively created to increase the reflectance of the film at that point.

19 Claims, 6 Drawing Figures

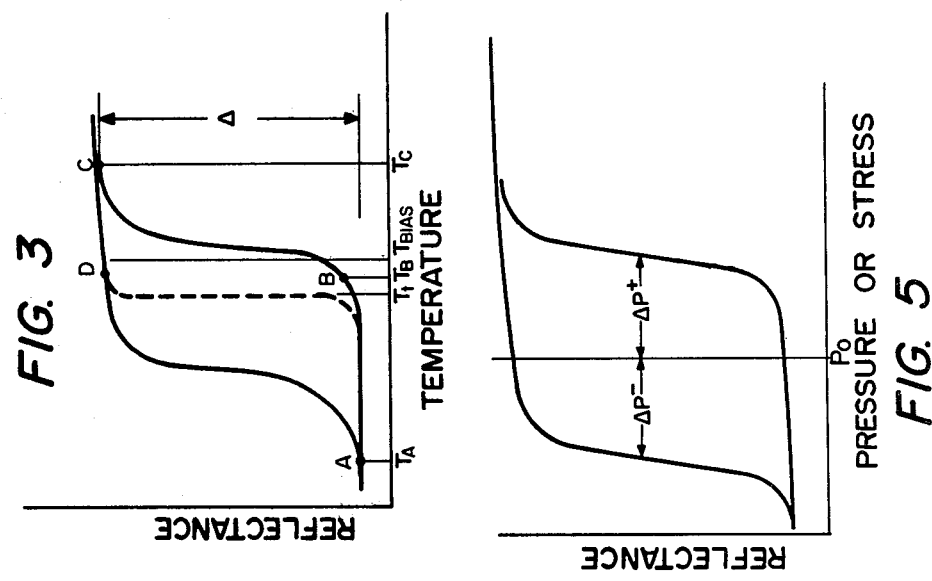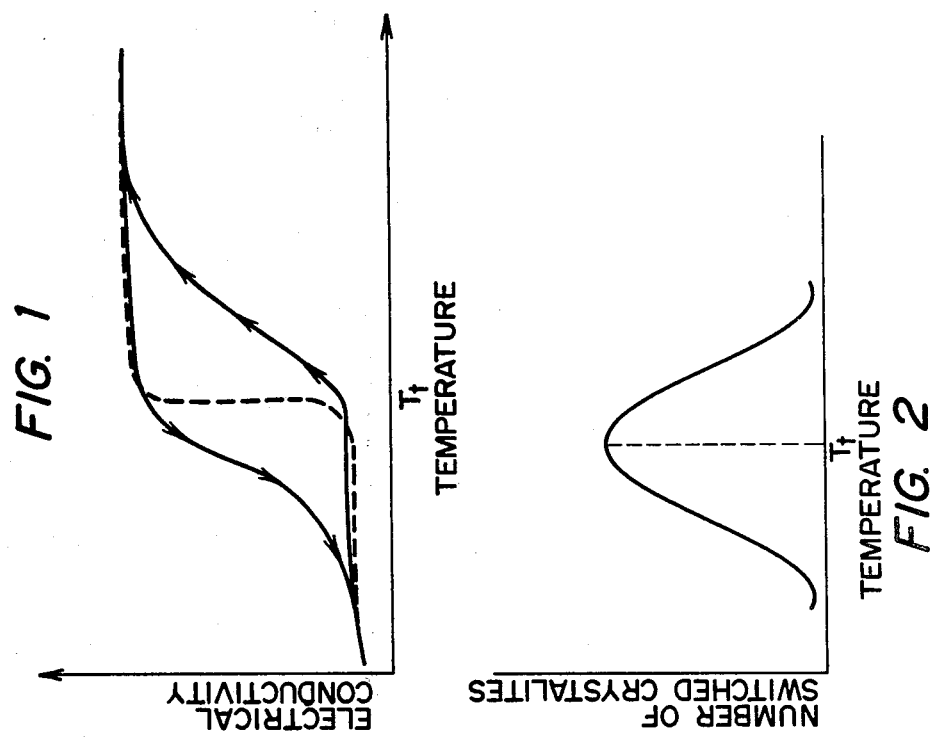

SWITCHING OF THERMOCHROMIC AND PRESSURE SENSITIVE FILMS WITH SURFACE ACOUSTIC WAVES

TECHNICAL FIELD

This invention relates to thermochromic and pressure sensitive films and more particularly to creation and destruction of images in such films with surface acoustic waves.

BACKGROUND ART

Thermochromic materials undergo marked changes in reflectance with changes in temperature. Thin films of thermochromic materials exhibit hysteresis with temperature changes, which makes them especially useful for recording and storing images.

Images can be created in these films at extremely high speeds by heating a region of the film with a laser or electron beam. As long as the ambient temperature of the film is maintained at a suitable recording temperature inside the hysteresis loop, these images will be stored in the film. Normally, these images are erased by allowing the entire film to cool from its recording temperature to some temperature below the loop. This radiative cooling, however, is extremely slow and impractical in applications calling for rapid writing and erasing of images. More direct means have been employed for cooling these films, such as direct cooling with thermoelectric junctions. These junctions can cool small areas of film relatively quickly, but are impractical for erasing large image displays because of the number of junctions required to cover the entire surface area of the display. Accordingly, there is a need for a method and apparatus for erasing thermochromic films at high speeds.

Certain pressure sensitive materials are known which exhibit properties similar to thermochromic films except that they undergo local changes in reflectance upon application of pressure or strain. Although these materials offer potential for displaying high resolution images, it has heretofore been difficult to exploit the optical properties of these materials because images cannot be "written" in the film by an electron beam or a laser. These materials, however, offer many advantages for "writing" and erasing images. A need thus arises for an apparatus and method for creating and erasing images in pressure sensitive materials.

DISCLOSURE OF THE INVENTION

In accordance with the present invention, methods and apparatus are disclosed for generating surface acoustic waves in thin films of thermochromic and pressure sensitive materials for writing and erasing images in such films.

In accordance with one embodiment of the invention an apparatus for "fast erase" of images written in thermochromic films is provided. A thin film of thermochromic recording material such as a vanadium oxide thin film is deposited on the surface of a piezoelectric substrate. An interdigital transducer provided on the surface of the substrate generates high frequency surface acoustic waves on the surface of the substrate and in the film to counteract the built-in strains present in the film and thereby "erase" images written into the film.

In accordance with a second embodiment of the invention, a solid state information display is provided. A thin film of pressure sensitive material of the type exhibiting a markedly increased reflectance at any region thereof when subjected to an external pressure or strain in excess of a threshold pressure is deposited on the substrate. First, second and third transducers are provided on the surface of the substrate for generating first, second and third surface acoustic waves of pressures approximately one quarter, one half and one quarter the threshold pressure, respectively. A timing means provides a video pulse signal to each of the first, second and third transducers at predetermined times such that the first, second and third waves will intersect at a preselected point in the film to create a region of pressure in excess of the threshold pressure, causing an increase in the reflectance of the film at that region to form an image against the surrounding area of the film at relatively low reflectance.

BRIEF DESCRIPTION OF THE DRAWINGS

FIG. 1 is a graph of the electrical conductivity of an unstrained vanadium dioxide crystal and a thin film of vanadium dioxide, as a function of temperature, in which the gross behavior of the strained crystals is depicted;

FIG. 2 is a graph of the distribution of switched crystallites in a vanadium dioxide thin film as a function of transition temperature;

FIG. 3 is a graph of the reflectance of vanadium dioxide thin film as a function of temperature;

FIG. 5 is a graph of the reflectance of pressure sensitive material as a function of stress or pressure.

DETAILED DESCRIPTION

"First Erase" Of Thermochromic Image Displays

Figure 4:
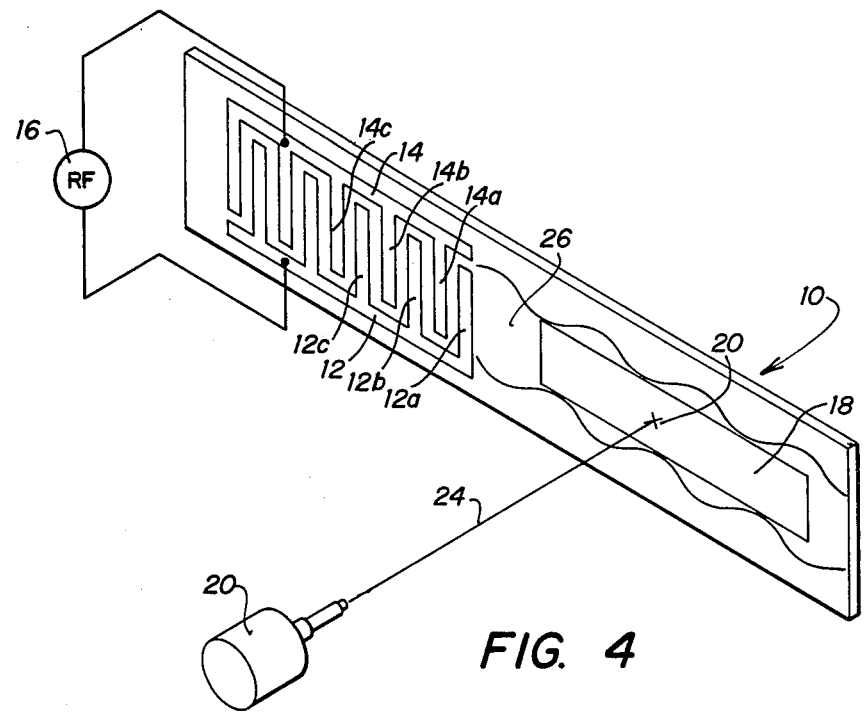
FIG. 4 is a perspective view of the first embodiment of the invention.

Materials which exhibit marked changes in reflectance with changes in temperature are known as thermochromic materials. Compounds such as certain ternary halides, ternary mono chalcogenides and certain transition metal oxides, such as certain vanadium oxides and titanium oxides, exhibit such properties.

As a result of thermodynamic phase transitions from a semiconductor to metal state, certain vanadium oxides and titanium oxides exhibit marked changes in physical properties such as reflectance, electrical conductivity and index of refraction with changes in temperatures in certain temperature ranges. In thin films of these materials, hysteresis effects are observed analagous to the ferromagnetic "memory" effects observed in certain ferromagnetic materials. These thermochromic films have been used for high contrast information displays in which information is written in the films by inducing local temperature changes and stored indefinitely by maintaining the temperature of the film at a suitable bias temperature.

FIG. 1 illustrates some of the physical properties of these materials, certain vanadium oxides and titanium oxides. The electrical conductivity of vanadium dioxide ($VO_2$), one member of this class, is represented in FIG. 1. The broken line in FIG. 1 represents the electrical conductivity of a single crystal of vanadium dioxide in its unstrained state as a function of temperature. As shown, the electrical conductivity for a single unstrained crystal has a modest value at low temperatures and undergoes a rather abrupt increase at the "transition temperature" shown by the substantially vertical portion of the curve, as the material passes from its semiconductor to metal state. This state transition is thermodynamically reversible; as the temperature of the crystal is decreased, the material returns to its semiconductor state along the path indicated by the broken line. Because the transition time between successive states is fairly rapid, between 10 milliseconds and 30 nanoseconds, it is appropriate to speak of "switching" these materials from one state to the other.

The thermochromic properties of certain titanium oxides and vanadium oxides, particularly the hysteresis effects observed in thin films of these materials, have been widely used in image display and recording applications. In addressing the characteristics of these thin films, it will be convenient to speak of "vanadium oxide thin films" or "VOTF." As these terms are used, they refer to thin films containing a large number of crystallites of ($Ti_4O_7$) or any of the vanadium oxides: vanadium dioxide ($VO_2$) or vanadium sesquioxide ($V_2O_3$).

Due to the strain sets built into these films, each individual crystallite in the film will switch from its semiconductor to metal state at a slightly different transition temperature. The transition temperatures for the entire population of strained crystallites in the film will be normally distributed about some mean transition temperature as best illustrated in FIG. 2. This mean temperature will be taken as the transition temperature of the entire film, although strictly speaking, the film has no single "transition temperature." As the temperature of the film, or a region thereof, is increased, an increasing number of the strained crystallites will be switched from the semiconductor to metal states as the transition temperatures of individual crystallites are exceeded. Macroscopically, the film will exhibit a smoother transition between the semiconductor and metal states unlike the single unstrained crystal in which the transition is rather sharp. This relatively smooth transition exhibited by the conductivity curve for a vanadium dioxide thin film is shown by the solid line in FIG. 1. Moreover, because of the strains present in these thin films, the physical properties of the films such as electrical conductivity or reflectance follow a hysteresis loop as shown in FIGS. 1 and 3. Thus, the transition between the semiconductor and metal states for unstrained crystals is rather sharp, whereas smoother transition with hysteresis effects are observed with thin films of thermochromic materials in which the crystals are due to the strains in the film.

In information display applications, reflectance is the physical property of the greatest usefulness. Abrupt changes in reflectance can occur in these films with very small temperature changes and high contrast images can be obtained resulting from the marked difference in reflectance between the switched region and the unswitched surrounding film. Because VOTF exhibit hysteresis effects, these "images" may be "captured" and stored in the film even when the temperature of the switched region falls below the transition temperature $T_t$, provided that the temperature of the film is maintained at a suitable temperature inside the hysteresis loop.

Referring now to FIG. 3, a graph of the reflectance of a thin film of vanadium dioxide is shown as a function of temperature. Let point A on the curve represent the reflectance of the entire film which is at some ambient temperature $T_A$ below the transition temperature, $T_t$ of the film. If a region R of the film is heated by the application of thermal energy to some temperature $T_B$ above the transition temperature, while the remainder of the film remains at temperature $T_A$, the reflectance of region R will increase to point B on the curve. As region R is heated above the transition temperature of the film, $T_t$, the reflectance of region R will rapidly increase as increasingly more of the strained crystallites in region R are switched to their metal state. When the transition temperature of the film is even further exceeded, say at temperature $T_C$, most or all of the strained crystallites in region R will be switched and region R will have relatively high reflectance, as shown by point C on the curve. The film outside region R remains at temperature $T_A$ and will have much lower reflectance, indicated by point A on the curve. The difference in reflectance, $\Delta$, between region R and the surrounding film will be sufficient to provide a high contrast image when exposed to light of an appropriate wavelength.

Figure 6:
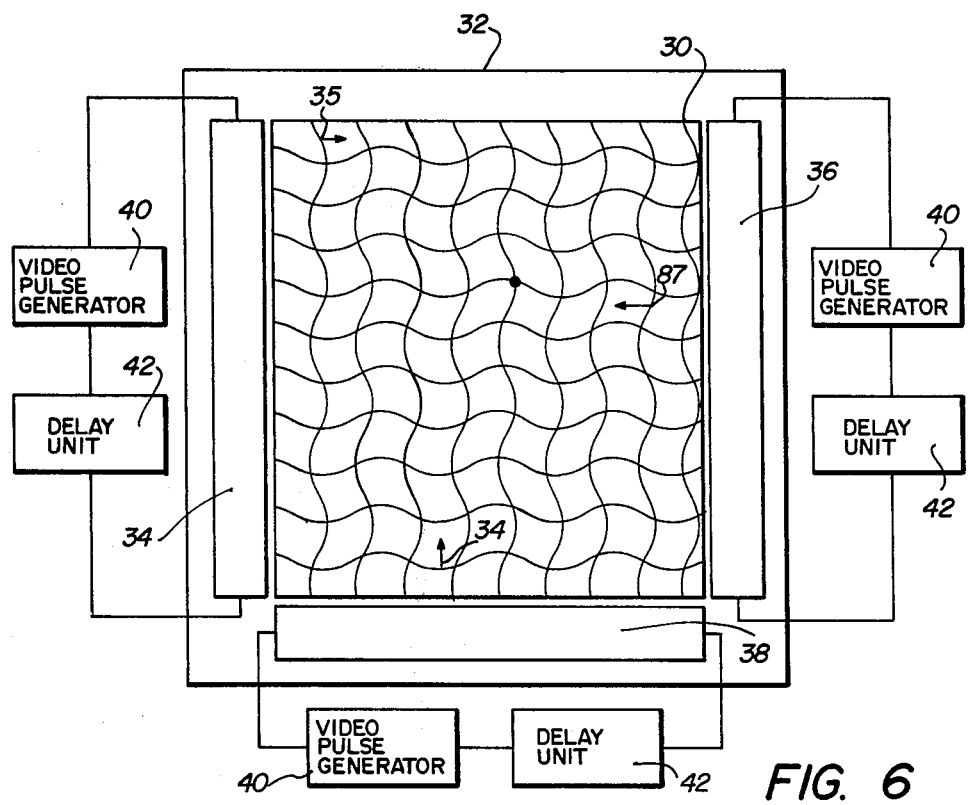
FIG. 6 is a top view of the second embodiment of the invention.

Conversely, by temporarily neutralizing or removing the strain sets built into the vanadium oxide thin films, and by biasing the temperature of the films just above the vertical portion of the curve for the unstrained crystal, e.g., at temperature $T_b$, it is possible to write on any region of the film. If the strains in the films are temporarily counteracted, all of the unstrained crystals will exhibit identical behavior, indicated by the broken line curve in FIGS. 1 and 3 and the unstrained portion of the film will be forced to assume a reflectance D. The surrounding portion of the film in which the strains have not been neutralized will continue to exhibit hysteresis effects and will assume a lower reflectance given by point B on the lower portion of the hysteresis curve. An apparatus for producing local strain free regions in the film with surface acoustic waves is illustrated in FIG. 6. As the apparatus is substantially identical to the apparatus disclosed for writing on certain pressure sensitive films, the structure will be explained below in the discussion of the second embodiment of the invention.

The particular wavelengths for which vanadium oxide thin films evidence such contrasts will depend upon the particular material used in the film since the absorption characteristics of the vanadium oxides are all different. Because vanadium dioxide has a transition temperature of about 67° C., it is the most practical material in this class, although its absorption characteristics limit its application in the visible part of the spectrum. Other members of the class have different transition temperatures: vanadium sesquioxide ($V_2O_3$), $-123°$ C.; ($Ti_4O_7$) $-125°$ C. and $-145°$ C. These materials may be practical in high or low temperature environments.

The absorption edge of vanadium dioxide in the semiconductor state is about one micron, which makes it especially suitable for applications in the infrared. Since vanadium dioxide films at wavelengths in the infrared have relatively low absorption in the semiconductor state and relatively high absorption in the metal state, a significant change in reflectance can be obtained by switching at wavelengths greater than one micron. However, since vanadium dioxide in its semiconductor state is highly absorbing at wavelengths less than 1 micron, other materials are more suitable for applications in the visible. One of these, samarium sulphide, a pressure sensitive material, is discussed below in connection with the second embodiment of the invention.

Referring again to FIG. 3, it will be observed that when region R begins to cool immediately after heating, it will exhibit a reflectance shown graphically by upper portion of the curve in FIG. 3 due to the hysteresis effects of the film. As region R cools from temperature $T_C$ to temperature $T_B$, the material will retain its relatively high reflectance as shown by point D on the upper portion of the reflectance curve. The film is thus bistable for certain temperatures within the loop, having two vastly different values of reflectance at temperature $T_B$, depending upon the thermal history of the material. To destroy the image written into the film, i.e., to reduce the reflectance of region R to that of the surrounding film, the temperature of region R must be lowered to some point below the hysteresis loop, such as to temperature $T_A$, which corresponds to point A on the curve. As the temperature of the film is lowered, the reflectance of region R will follow the upper part of the curve.

ALL VOTF exhibit the hysteresis behavior shown in FIGS. 1 and 3. Typically the hysteresis loop will be from 5°–30° C. wide, centered about the transition temperature $T_t$ of the film. The width of the loop is highly dependent upon the process for making the film and the width of the loop can be controlled to some extent by controlling the process for making the films. Although the width of the loop is somewhat variable, however, it has not been possible to eliminate the hysteresis effects from the film completely.

If the entire film is maintained at some ambient temperature, $T_{BIAS}$, inside the hysteresis loop near where the slope of the curve is large, great variation in reflectance can be obtained for very small temperature changes. With the film so biased any "image" thermally written into the film will be retained after the temperature of the film relaxes to its bias temperature, since in cooling, region R will follow the upper part of the hysteresis curve with very little loss of reflectance. The image can thus be "stored" for indefinite periods of time and eventually erased by lowering the temperature of the film well below the loop say to temperature $T_A$.

Several methods are employed for thermodynamically switching VOTF from the semiconductor to metal states, depending upon the application. Resistive heating, laser radiation in both the visible or infrared and ion or electron bombardment have been among the most successful methods employed. Resistive heating, although highly effective, is disadvantageous in many applications due to the low switching speeds attained. Laser or electron beam bombardment provides high speed switching at speeds ranging from about 10 milliseconds up to about 30 nanoseconds. It is also possible, as indicated above, to switch these films nonthermodynamically, i.e., by temporarily removing the built-in strains.

Although the thermal diffusivity of the film limits the resolution that can be obtained by thermal heating, it has nevertheless been possible by using a laser or an electron beam to supply sufficient thermal energy, about 5 millijoules per $cm^2$/micron of film thickness, within a sufficiently short time interval to achieve resolutions of up to 19 microns with an electron beam and up to about 3 microns with a laser. Because the speeds and resolutions obtained from VOTF exceed those obtained by conventional cathode ray tubes and other conventional image display devices, these films offer significant advantages. Although "writing" of images in such films using an electron beam or laser is extremely fast, there is presently no method for efficiently erasing such films at even millisecond speeds. Any of the variety of methods used for lowering the temperature of the film are clearly insufficient or impractical from the standpoint of erasure of entire films at high speeds.

Because the hysteresis effect observed in thin films of vanadium oxide do not result from thermal effects but from the strains present in the films, it is feasible to "collapse" or eliminate the hysteresis loop to eliminate these strain effects by inducing counterstrains in the film and biasing the temperature of the film just below the vertical portion of the strain free crystal curve. With the development of surface acoustic wave technology, it is now possible to induce counterstrains in such films by sonic waves, to remove the hysteresis effects to either "write" or erase images already stored in the films.

Surface acoustic waves are elastic sonic waves which travel along the free surface of a solid having both longitudinal and shear components with zero normal force in the plane of the surface. Surface acoustic waves can be generated at the free surface of certain piezoelectric crystals by applying a voltage to the crystal which causes elastic dilation or contraction of the crystal, resulting in the generation of surface acoustic waves along the surface. The energy of these waves is confined to the interface between the crystal surface and the air or, in the case of a film on the surface of the crystal, within the film. These waves propagate along the surface of such crystals at relatively high velocities. For example, in lithium niobate crystals, these waves travel at a velocity of about $3 \times 10^5$ cm per second.

By applying a suitable voltage to these crystals, a surface acoustic wave can be generated which has sufficient energy to alter the built-in strains in the VOTF. As a wave passes through film, the strains in the film are momentarily counterbalanced, the hysteresis effects momentarily disappear and the instantly unstrained crystallites in the film momentarily follow the transition curve shown by the broken lines in FIGS. 1 and 3. Because no hysteresis effects are present, the reflectance can have only a single value at any given temperature. If the film in its strained state is biased just below the vertical portion of the strain free curve, the region of high reflectance is forced to assume the same reflectance as the surrounding film. Once the wave has passed through the film, the strains in the film again exert themselves and hysteresis effects are again observed. However, since region R has the same reflectance as the surrounding film, both region R and the surrounding film will exhibit the same reflectance on the lower portion of the curve.

FIG. 4 illustrates the first embodiment of the invention in which the surface acoustic waves are used to provide "fast erase" for a vanadium dioxide thin film. A particularly efficient device for generating surface acoustic waves is an interdigital transducer formed on a piezoelectric substrate 10. The interdigital transducer 11 consists of two electrodes 12 and 14 disposed upon the upper surface of the piezoelectric substrate. Electrodes 12 and 14 each have a series of spaced fingers 12a, 12b, 12c, 12d, 12e and 14a, 14b, 14c, 14d, 14e, interdigitally spaced to form electrode pairs 12a, 14a, 12b, 14b, 12c, 14c, 12d, 14d and 12e, 14e on the substrate surface. Electrodes 12 and 14 are connected to an RF source 16 which provides a signal of sufficiently high frequency to match the resolution of the images. An overlay of vanadium oxide thin film 18 of an appropriate thickness for the desired application is then deposited upon the substrate by conventional vacuum depositing techniques. A heat source 20 such as a laser or electron gun directed toward the film writes images at desired points on the film by electron or laser beam 24.

When a high frequency RF signal is applied to the electrodes 12 and 14, an electric field will be created between each of the transducer pairs 12a and 14a, 12b and 14b, and 12c and 14c, etc., in a direction corresponding to the sign of the voltage. The electric field between electrode pairs causes mechanical deformation of the substrate, either a compression or dilation depending upon the direction of the field. By using conventional techniques of x-ray diffraction, the vandium dioxide thin film can be laid down on the substrate so that its uniaxial polarization of strain will be in the direction of the waves. Thus, elastic deformation of the substrate by an appropriate RF signal will generate an acoustic surface wave along the surface of the substrate which propagate through the vanadium dioxide film, creating a train of wave fronts 26 which will counterbalance the built-in strains in the film and thereby collapse the hysteresis loop, "erasing" any information stored in the film.

Although there are many types of piezoelectric crystals suitable for such applications, lithium niobate crystals are preferred because of the high coupling achieved between the electrical and acoustical signals. Quartz and potassium dihydrogen phosphate crystals, however, would also be suitable in such applications.

The interdigital transducer 11 can be created on the substrate by conventional photolithographic techniques whereby a metal, such as aluminum, is evaporated on the surface of the crystal through a mask made by a photo-reduction process. The electrode pairs 12a, 12b, 12c and 14a, 14b and 14c can be appropriately spaced such that each electrode pair excites a wave which positively reinforces the other waves to create a single large surface acoustic wave 26. At frequencies of about 1 GHz, for example, spacing of about 0.8 microns is required to obtain this constructive reinforcement.

Vanadium oxide thin films can be designed for a particular purpose in accordance with techniques well known in the art. Vanadium dioxide films with thicknesses on the order of 0.5-1.0 microns achieve sufficient on/off ratios from 1 to 1,000 to 1 to 10,000 in the infrared. For example, with a $VO_2$ film of this thickness at a wavelength of 10 microns, transmission of greater than 95% is obtained in the semiconductor state and about $10^{-4}$% in the metal state. Although vanadium dioxide films will be preferred in many applications because its transition temperature is about 67° C., other vanadium oxide thin films which have different transition temperatures will, of course, be dictated by other applications.

Thus, information can be written into the films at extremely high speeds, and in accordance with the present invention, vanadium oxide thin film can be erased at speeds better than a millisecond. For example, using a lithium niobate substrate with an image display of 10 cm wide, it would be possible to erase the entire film in about 30 microseconds.

Solid State Cathode Ray Tube

Like the hysteresis effects observed in VOTF, which are caused by the strains present in thin films (internal strains in the individual crystals), materials such as samarium sulphide, samarium selenide, samarium telluride, samarium oxide and other rare earth mono chalcogenides also exhibit hysteresis effects resulting from internal strains in the individual crystals. Unlike thermochromic materials, in which the state changes are brought about by thermodynamic processes, however, such materials undergo change from the semiconductor to metal state as the result of pressure applied to or strains induced in the film.

Samarium sulphide, one of these pressure sensitive materials, is particularly suitable for use in visual information displays because its band edge is about 5000 Å. Samarium sulphide has low absorption in the semiconductor state and high absorption in the metal state in both the visible and the infrared.

FIG. 5 depicts the reflectance of a thin film of samarium sulphide at a wavelength of 8000 Å as a function of pressure or stress. Because hysteresis is observed not only in the single crystal, but in thin films of these pressure sensitive materials as well, images can be written and stored in any films in which the internal strain of the film is either inside the hysteresis loop, or is maintained at same pressure $P_o$ inside the loop. In the case of samarium sulphide it is possible to make the film such that its internal strain $P_o$ is conveniently within the loop.

The square nature of the hysteresis loop for samarium sulphide and other pressure sensitive films, shown in FIG. 5, makes it possible to obtain high contrast images by creating local regions of pressure in the films of sufficient magnitude to obtain the desired reflectance. The amount of external pressure required to switch the film to a particular high reflectance is called the threshold pressure $\Delta P$. According to the present invention, several surface acoustic waves intersect to to form regions of high pressure to switch the film at this region to its high reflectance state.

FIG. 6 illustrates the preferred embodiment of a solid state information display whereby surface acoustic waves are used to create images in pressure sensitive films. A thin film of pressure sensitive material 30, such as samarium sulphide, is deposited on a substrate 32 of piezoelectric material such a potassium dihydrogen phosphate, lithium niobate or quartz. The samarium sulphide film is deposited on the substrate by conventional vacuum deposition techniques. Pressure sensitive films such as samarium sulphide can be made having an internal strain $P_o$, inside the hysteresis loop as shown in the graph of FIG. 5. Thus, an external pressure P in excess of the threshold pressure $\Delta P$ is sufficient to switch the material from its semiconductor to metal state at the region of high pressure. Since these pressure sensitive films also exhibit hysteresis, the high reflectance exhibited by a region R of the film will not appreciably change when the external pressure P is removed.

Three surface acoustic wave transducers 34, 36 and 38 are formed on the substrate 32 having precisely the same structure as discussed above in connection with the first embodiment shown in FIG. 4. Eastward transducer 34, positioned on the left hand side of the film, is energized to create a surface acoustic pulse 35 having magnitude $\Delta P/4$ which propagates through the film in an eastwardly direction as shown in FIG. 6. Similarly, westward transducer 36, positioned opposite eastward transducer 34, generates a surface acoustic pulse 37 of magnitude $\Delta P/4$ which travels in the opposite or westward direction. A northward transducer 38 positioned at the south edge of the film between the eastward transducer 34 and westward transducer 36, generates a surface acoustic pulse 39 of magnitude $\Delta P/2$ in a northward direction. At the point on the film where all of three pulses interesect, the pressure in the film is $\Delta P/4 + \Delta P/4 + \Delta P/2 = \Delta P$, the amount of pressure needed to counteract the internal strain of the crystallites in the film to switch the high pressure point in the film from the semiconductor to metal state.

As a practical matter, the eastward and westward transducers 34 and 36 must produce pulses having pressure in excess of $\Delta P/4$ and the northward transducer 38 a pulse of pressure in excess of $\Delta P/2$ to ensure that there is always pressure of $\Delta P$ at the point of intersection. However, the pressures of these respective pulses cannot be so much in excess of these ideal values that intersection of any two pulses can switch the film.

By launching the northern, eastward and westward pulses at different times, it is possible to switch any predetermined point on the film. It is also possible to erase or remove any such image by generating a strain or pressure opposite in effect at any point at which an image has been created. By reversal of the electric field in the substrate, negative pulses or pressures opposite in effect can be created which will counteract the internal strains of the material, eliminate the hysteresis effects and "erase" any image on the film. By launching positive and negative pulses at different times, a rapidly updatable "picture" or "display" can be created in the film with resolutions greatly in excess of those possible with the conventional cathode ray tube. With existing oscillators it should be possible to obtain images with a resolution of about 1 micron, writing and erasing points on the display at times of several microseconds.

The RF signal necessary to switch any minute region of the film can be conveniently supplied by a video pulse generator 40. The timing of the signal can be controlled by a conventional delay unit 42 interposed between the pulse generator 40 and transducers 34, 36 and 38. The pulses can be switched to different transducers and the time delays controlled by external circuitry or by a microprocessor or digital computer, programmed for any particular application.

Any one of the transducers can be operated to produce a pulse exerting a negative pulse of pressure sufficiently in excess of the threshold pressure to erase the entire film or produce such a pulse causing a strain of opposite effect to write on the entire film.

As indicated above, it is also possible to write on nonpressure sensitive thermochromic films such as the vanadium oxide thin films with the above described solid state information display apparatus. By counterbalancing or eliminating the built-in strains in a selected region of the VOTF, that region of the film is forced into a high reflectance state, in contrast to the surrounding strained portion of the film. By carefully controlling the temperature of the film so that it is biased just above the vertical portion of the unstrained curve, the transducer can be used to write images by launching intersecting surface acoustic waves in the film which force the region where the waves intersect into the high reflectance state. By biasing the temperature of the film just below the vertical portion of the unstrained crystal curve, the selected imaged region in the thermochromic film can be erased by momentarily neutralizing the strains in the film as this will force the imaged region into a low reflectance state thereby eliminating the contrast with the surrounding region.

Whereas the present invention has been described with respect to specific embodiments thereof, it is to be understood that various changes and modifications will be suggested to one of ordinary skill in the art and it is intended to encompass such changes and modifications as fall within the scope of the appended claims.

I claim:

1. Apparatus for erasing thermochromic information displays comprising:
   a piezoelectric substrate;
   a vanadium oxide thin film deposited on the surface of said substrate, said film capable of undergoing marked increases in reflectance relative to the surrounding areas of said film at any region thereof heated above the transition temperature of the film, the reflectance of said film exhibiting hysteresis with temperature at temperatures near said transition temperature; and
   means for generating high frequency surface acoustic waves on the surface of said substrate, said waves having sufficient energy to counterbalance the strains present in said film.

2. The apparatus of claim 1 wherein said substrate is a lithium niobate crystal.

3. The apparatus of claim 1 wherein said generating means includes at least one pair of electrodes spaced apart in substantially parallel relation such that application of an RF signal across said pair causes deformation of said substrate to create surface acoustic waves on the surface thereof.

4. The apparatus of claim 3 wherein said generating means includes a plurality of electrode pairs, each of said pairs spaced apart a predetermined distance such that said surface acoustic waves generated by said first pair reinforce the surface acoustic waves created by the other of said pairs.

5. Apparatus for erasing thermochromic information displays comprising:
   a lithium niobate substrate;
   a vanadium oxide thin film deposited on the surface of said substrate, said film capable of undergoing marked increases in reflectance relative to surrounding areas of said film at any region thereof heated above the transition temperature of said film, the reflectance of said film exhibiting hysteresis with temperature at temperatures near said transition temperature;
   an acoustical transducer on the surface of said substrate containing at least one pair of electrodes spaced apart in substantially parallel relation for generating surface acoustic waves on the surface thereof;
   said film oriented on said substrate such that the internal strains in said film are polarized by surface acoustic waves; and
   an RF source connected to said electrodes for energizing said acoustical transducers.

6. In a thermochromic display for writing and erasing images the combination comprising:
   a piezoelectric substrate;
   a thermochromic recording film deposited on the surface of said substrate, said film undergoing markedly increased reflectance at any region thereof heated in excess of the transition temperature of the film, the reflectance of said film exhibiting hysteresis with temperature at temperatures near said transition temperature;
   a thermal energy source for selectively heating regions of said film in excess of the transition temperature to create high contrast images in said film; and
   means for generating high frequency surface acoustic waves in said film on said substrate, said waves having sufficient energy to counteract the strains in said film.

7. The combination of claim 6 wherein said substrate is a lithium niobate crystal.

8. The combination of claim 6 wherein said means for generating surface acoustic waves includes at least one pair of electrodes spaced apart in substantially parallel relation on the surface of said substrate such that application of an RF signal across said pair causes deformation of said substrate to create surface acoustic waves on the surface thereof having sufficient energy to counteract the strains in the film.

9. A method for erasing images created in vanadium oxide thin films, comprising:
generating a surface acoustic wave of high frequency in said film of sufficient energy to counteract the stresses present in said film.

10. A solid state information display comprising:
a thin film of pressure sensitive material capable of undergoing markedly increased reflectance at regions thereof subject to an external pressure in excess of a predetermined threshold pressure, the reflectance of said film exhibiting hysteresis with changes in external pressure such that any said increase in reflectance is substantially unchanged when said external pressure is removed; and
first, second and third means responsive to an RF signal for generating first, second and third surface acoustic waves in said film, said first, second and third acoustic waves creating regions of increased pressure in said film such that any point at which all three waves intersect will undergo a pressure in excess of said threshold pressure thereby causing an increase in reflectance of said film at said point of intersection.

11. The information display of claim 10 wherein said film is samarium sulfide.

12. The information display of claim 11 wherein said first, second and third means include a surface acoustic wave transducer responsive to an RF signal for generating a surface acoustic wave of relatively high frequency.

13. The information display of claim 10 further comprising:
means for supplying each of said surface acoustic wave transducers with an RF signal of appropriate energy at a preselected time to generate first, second and third waves which will intersect at a selected point on said film to form a region in said film of pressure in excess of said threshold pressure to switch the film at said region to a state of higher reflectance.

14. A solid state information display comprising:
a piezoelectric substrate;
a thin film of pressure sensitive material deposited on the surface of said substrate, said material capable of exhibiting markedly increased reflectance at any region thereof subjected to an external pressure in excess of a predetermined threshold pressure, the reflectance of said film exhibiting hysteresis such that the increased reflectance at any such region is substantially unchanged when said pressure is removed;
first, second and third surface acoustic wave transducers disposed on the surface of said substrate and responsive to first, second and third signals for causing deformations in said substrate to generate surface acoustic waves on the surface thereof and in said film;
said waves creating regions of pressure in said film such that the regions where any two of said first, second or third waves intersect, the pressure at said regions is always less than said threshold pressure and the pressure at any point where all three of said waves intersect is in excess of said threshold pressure thereby causing an increase in reflectance in the film at said point;
generating means for supplying first, second and third input signals to said first, second and third transducers; and
timing means connected between said generating means and said first, second and third transducers for supplying an RF signal to each of said transducers at a preselected time.

15. The information display of claim 14 wherein said substrate is a lithium niobate crystal.

16. The information display of claim 14 wherein each of said first, second and third transducers include:
at least one pair of electrodes on said substrate spaced apart in substantially parallel relation such that when an electric field is created between each of said pairs by one of said input signals, said substrate undergoes deformation creating a surface acoustic wave on the surface thereof and in said film.

17. A method for creating high resolution images at predetermined locations on a pressure sensitive film, capable of switching from a lower to higher reflectance at regions of switching from a lower to higher reflectance at regions thereof subjected to pressures in excess of a predetermined threshold pressure, comprising the steps of:
generating a first acoustic surface wave train in said film of a first pressure at a first preselected time;
generating a second acoustical surface wave in said film of a second pressure in a direction perpendicular to said first wave at a second preselected time;
generating a third acoustic surface wave in said film of a third pressure in a direction substantially opposite to said second wave at a third preselected time;
said first, second and third pressures selected such that a point of intersection of said first, second and third waves will be subjected to a resulting pressure in excess of said threshold pressure to switch the film at said point to a higher reflectance and any regions where any two of said first, second and third waves intersect will experience a pressure less than said threshold pressure; and
selecting said first, second and third times to switch a preselected point on said film to a higher reflectance.

18. A method for selectively erasing images formed in pressure sensitive films which undergo increased reflectance at regions thereof when subjected to pressure in excess of a predetermined threshold pressure, comprising the steps of:
generating a first acoustic surface wave in said film of a first pressure opposite in effect to the internal strains of said film in a first direction at a first preselected time;
generating a second acoustical surface wave in said film of a second pressure opposite in effect to the internal strains of said film in a second direction substantially perpendicular to said first direction at a second preselected time;
generating a third acoustic surface wave in said film exerting a third pressure opposite in effect to the internal strains of said film in a third direction substantially opposite to said second direction and perpendicular to said first direction at a third preselected time; and said first, second and third pressures selected such that a point of intersection of said first, second and third waves will subject said point to a pressure sufficient to counterbalance the induced strain at said point and any regions where any two of said waves intersect will not experience sufficient strain to counteract said internal strain.

19. A solid state information display comprising:

a vanadium oxide thin film, the film exhibiting hysteresis due to strains built into the film, said film capable of undergoing marked changes in reflectance relative to surrounding areas of said film at regions thereof heated in excess of the transition temperature; and first, second and third means responsive to an RF signal for generating first, second and third surface acoustic waves in said film, said first, second and third acoustic waves creating regions of strain, opposite in effect to the strains built into said film such that at the point at which all three waves intersect the hysteresis effects due to built-in strains will vanish thereby resulting in an increased reflectance at said point of intersection when said film is biased at a temperature in excess of the transition temperature.

* * * * *